United States Patent
Huang (10) Patent No.: US 10,929,010 B2
(45) Date of Patent: Feb. 23, 2021

(54) TOUCH RESPONSE METHOD FOR TOUCHSCREEN, APPARATUS, AND TERMINAL

(71) Applicant: HUAWEI TECHNOLOGIES CO., LTD., Shenzhen (CN)

(72) Inventor: Hai Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/313,161

(22) PCT Filed: Jun. 30, 2016

(86) PCT No.: PCT/CN2016/087838
§ 371 (c)(1),
(2) Date: Dec. 26, 2018

(87) PCT Pub. No.: WO2018/000297
PCT Pub. Date: Jan. 4, 2018

(65) Prior Publication Data
US 2019/0155499 A1    May 23, 2019

(51) Int. Cl.
*G06F 3/0488* (2013.01)
*G06F 3/0484* (2013.01)
(Continued)

(52) U.S. Cl.
CPC ...... *G06F 3/04883* (2013.01); *G06F 3/04186* (2019.05); *G06F 3/04847* (2013.01);
(Continued)

(58) Field of Classification Search
CPC ............. G06F 3/04883; G06F 3/04186; G06F 3/04886; G06F 3/04847; G06F 3/0412;
(Continued)

(56) References Cited

U.S. PATENT DOCUMENTS

2011/0148788 A1 * 6/2011 Wu ................... G06F 3/0414
345/173
2013/0201160 A1    8/2013 Ito et al.
(Continued)

FOREIGN PATENT DOCUMENTS

| CN | 102479040 A | 5/2012 |
|---|---|---|
| CN | 103995663 A | 8/2014 |

(Continued)

*Primary Examiner* — Andrew Sasinowski
(74) *Attorney, Agent, or Firm* — Kilpatrick Townsend & Stockton LLP (57) ABSTRACT

Embodiments of the present invention disclose a touch response method for a touchscreen and a terminal. The touch response method for a touchscreen includes: detecting touch pressure values of at least two touch points applied on a touchscreen; comparing the touch pressure values of the at least two touch points to obtain at least one valid touch point, where a touch pressure value of the valid touch point is greater than a touch pressure value of an invalid touch point of the at least two touch points; and determining a touch operation corresponding to the valid touch point, and performing the touch operation. According to the embodiments of the present invention, a failure in responding to a touch operation corresponding to a touch point on a touchscreen can be avoided, and touch operation processing efficiency can be improved.

12 Claims, 6 Drawing Sheets

(51) Int. Cl.
*G06F 3/041* (2006.01)
*G06F 3/044* (2006.01)

(52) U.S. Cl.
CPC ........ *G06F 3/04886* (2013.01); *G06F 3/0412* (2013.01); *G06F 3/0445* (2019.05); *G06F 3/0446* (2019.05); *G06F 2203/04104* (2013.01); *G06F 2203/04105* (2013.01); *G06F 2203/04808* (2013.01)

(58) Field of Classification Search
CPC ........ G06F 3/0445; G06F 2203/04105; G06F 2203/04808; G06F 2203/04104; G06F 3/0446; G06F 3/0488; G06F 3/0416; G06F 3/0414

See application file for complete search history.

(56) References Cited

U.S. PATENT DOCUMENTS

| | | | |
|---|---|---|---|
| 2015/0029139 A1* | 1/2015 | Oshita | G06F 3/044 345/174 |
| 2015/0116205 A1 | 4/2015 | Westerman et al. | |
| 2015/0149899 A1 | 5/2015 | Bernstein et al. | |
| 2015/0324116 A1* | 11/2015 | Marsden | H03K 17/9622 345/158 |
| 2015/0338984 A1* | 11/2015 | Hunt | G06F 3/0416 345/173 |

FOREIGN PATENT DOCUMENTS

| | | |
|---|---|---|
| CN | 105094636 A | 11/2015 |
| CN | 105700814 A | 6/2016 |
| JP | 2013161221 A | 8/2013 |
| JP | 2015148857 A | 8/2015 |
| JP | 2016505966 A | 2/2016 |
| KR | 20150093840 A | 8/2015 |

* cited by examiner

TOUCH RESPONSE METHOD FOR TOUCHSCREEN, APPARATUS, AND TERMINAL

CROSS-REFERENCE TO RELATED APPLICATIONS

This application is a national stage of International Application No. PCT/CN2016/087838, filed on Jun. 30, 2016, which is hereby incorporated by reference in its entirety.

TECHNICAL FIELD

Embodiments of the present invention relate to the field of electronic technologies, and in particular, to a touch response method for a touchscreen, an apparatus, and a terminal.

BACKGROUND

A touchscreen also referred to as a touch panel or a touchscreen, is an inductive liquid crystal display apparatus that can receive a touch signal input by a contact. When the contact touches a graphic button on a display, a tactile feedback system on the display may drive a variety of connected apparatuses according to a pre-programmed application program. The touchscreen can be used to replace a mechanical button panel and produce a vivid audio and video effect by using a liquid crystal display.

A terminal with a touchscreen usually has a frozen screen during use, that is, a touchscreen cannot respond to a touch signal input by a contact. There are many reasons why a screen freezes. For example, when the terminal is put in a pants pocket, the touchscreen is in contact with a thigh. When an automatic screen wake-up event (such as an incoming call or an incoming notification message) is detected, the touchscreen is in a screen-on state and can receive a touch signal input by the contact. Because the touchscreen is in contact with the thigh and the thigh is a conductor, the thigh may act as a contact to input touch information on the touchscreen, and the touchscreen generates a baseline (Baseline). The thigh is in contact with the touchscreen during a process of generating the baseline by the touchscreen. Consequently, a part of the baseline becomes abnormal and produces a ghost point, and the touchscreen cannot respond to a touch signal due to the ghost point. Therefore, how to prevent a frozen screen of a terminal is an urgent problem to be resolved.

SUMMARY

Embodiments of the present invention provide a touch response method for a touchscreen and a terminal, so as to avoid a failure in responding to a touch operation corresponding to a touch point on a touchscreen, and improve touch operation processing efficiency.

A first aspect of the present invention provides a touch response method for a touchscreen, including: detecting touch pressure values of at least two touch points applied on a touchscreen; comparing the touch pressure values of the at least two touch points to obtain at least one valid touch point, where a touch pressure value of the valid touch point is greater than a touch pressure value of an invalid touch point of the at least two touch points; and determining a touch operation corresponding to the valid touch point, and performing the touch operation.

It is found through research that when a touch point applied on a touchscreen is a ghost point, a touch pressure value of the ghost point approaches zero. In addition, when a user single-handedly operates a terminal, a palm usually comes into contact with the touchscreen to cause an accidental touch. A touch pressure value of a touch point generated by the accidental touch is relatively small. In addition, during a process of operating the terminal by the user, a child may grab the cell phone or aimlessly tap the touchscreen. A touch pressure value of a touch point generated by grabbing the cell phone or aimlessly tapping the touchscreen by the child is relatively small. However, a touch pressure value of a touch point generated when the user inputs an operation instruction is relatively large. For example, a tapping force used when the user taps a virtual key having a photographing function on an image preview screen is relatively large, or a tapping force on each touch point when the user multi-touches a display screen to adjust a size of the display screen is relatively large. In a conventional terminal, for either a Windows system, an Android system, an iOS system, or various APPs, a currently displayed screen responds only to a touch gesture (such as a single touch, a multi-touch, a touch and hold, a slide, or a multi-slide) that is included in a preset gesture database. When a ghost point occurs or there is a touch operation that does not match the touch gesture in the preset database, the touch operation cannot be responded to. Based on this, the following technical solution is proposed: when detecting at least two touch points applied on a touchscreen, a terminal detects a touch pressure value of each touch point by using a force sensor, compares the detected touch pressure values of the touch points to obtain at least one valid touch point, where a touch pressure value of the valid touch point is greater than a touch pressure value of an invalid touch point of the at least two detected touch points, determines a touch operation corresponding to the valid touch point, and performs the touch operation. In this way, a failure, of a terminal, in responding to a touch operation corresponding to a touch point on a touchscreen can be avoided, and touch operation processing efficiency can be improved.

The touch pressure values of the at least two touch points applied on the touchscreen are different from each other. The terminal may use a touch point with a larger touch pressure value as the valid touch point, and use a touch point with a smaller touch pressure value as the invalid touch point. A touch pressure value of the valid touch point is greater than a touch pressure value of the invalid touch point. For example, the terminal may use a touch point, with a largest touch pressure value, of the at least two touch points applied on the touchscreen as the valid touch point, and use a touch point, other than the valid touch point, of the at least two touch points applied on the touchscreen as the invalid touch point. For another example, the terminal may sort the touch points in descending order (or ascending order) of the touch pressure values, and obtain a touch point with a larger touch pressure value from the at least two touch points applied on the touchscreen. A quantity of obtained touch points is less than or equal to a quantity of touch points supported by a currently displayed screen on the touchscreen. The terminal may use the obtained touch point as the valid touch point, and use a touch point, other than the valid touch point, of the at least two touch points applied on the touchscreen as the invalid touch point. For another example, the terminal may use a touch point whose touch pressure value is greater than a preset pressure threshold and that is of the at least two touch points applied on the touchscreen as the valid touch point, and use a touch point, other than the valid touch point, of the at least two touch points applied on the touchscreen as the invalid touch point.

The force sensor may include a resistance strain gauge pressure sensor, a semiconductor strain gauge pressure sensor, a piezoresistive pressure sensor, an inductive pressure sensor, a capacitive pressure sensor, a resonant pressure sensor, a capacitive acceleration sensor, and the like.

The touch operation may be photographing, answering a call, playing music, or the like, and this is not limited in this embodiment of the present invention.

Optionally, the comparing, by the terminal, the touch pressure values of the at least two touch points to obtain at least one valid touch point may be specifically: obtaining a touch point with a largest touch pressure value, and using the touch point with the largest touch pressure value as the valid touch point. For example, when detecting that a touch point applied on the touchscreen includes a first touch point, a second touch point, and a third touch point, the terminal detects, by using the force sensor, that a touch pressure value of the first touch point is 1N, a touch pressure value of the second touch point is 2N, and a touch pressure value of the third touch point is 10N. The touch pressure value of the third touch point is the largest, and the terminal may use the third touch point as the valid touch point.

Optionally, the comparing, by the terminal, the touch pressure values of the at least two touch points to obtain at least one valid touch point may be specifically: obtaining a quantity of touch points supported by a currently displayed screen on the touchscreen; and comparing the touch pressure values of the at least two touch points to obtain the at least one valid touch point, where a quantity of valid touch points is less than or equal to the quantity of touch points supported by the currently displayed screen.

For example, when the terminal detects that there are three touch points applied on the touchscreen, the terminal may detect a touch pressure value of each touch point by using the force sensor. A currently displayed screen on the touchscreen is an image preview screen of a photographing application, and the terminal obtains that the image preview screen supports one touch point. The terminal may compare the detected touch pressure values of the touch points, and determine a touch point with a largest touch pressure value as the valid touch point.

For another example, when the terminal detects that there are three touch points applied on the touchscreen, the terminal may detect a touch pressure value of each touch point by using the force sensor. A currently displayed screen on the touchscreen is an image screen, and the terminal obtains that the image screen supports two touch points. The terminal may compare the detected touch pressure values of the touch points, and use a touch point with a largest touch pressure value as the valid touch point. Optionally, the terminal may use two touch points with larger touch pressure values or the touch point with the largest touch pressure value as the valid touch point.

In this technical solution, the quantity of valid touch points is less than or equal to the quantity of touch points supported by the currently displayed screen, and the touch operation corresponding to the valid touch point is performed. As a result, it can be avoided that when the quantity of valid touch points applied on the touchscreen by the user is greater than the quantity of touch points supported by the currently displayed screen on the touchscreen, the terminal performs none of touch operations corresponding to the touch points, and touch operation processing efficiency can be improved.

Optionally, the determining, by the terminal, a touch operation corresponding to the valid touch point, and performing the touch operation may be specifically: determining a valid touch point with a largest touch pressure value from the at least one valid touch point; and when a touch gesture indicated by the valid touch point with the largest touch pressure value matches a specified gesture in a preset gesture database, performing a touch operation corresponding to the valid touch point with the largest touch pressure value. The preset gesture database stores at least one gesture, such as a tap operation performed on a location at which a virtual key having a photographing function is located on the touchscreen, or a slide operation performed on an image screen of the touchscreen.

In specific implementation, the terminal may divide the preset gesture database into multiple gesture resource pools, and different display screens are corresponding to different gesture resource pools. For example, a gesture resource pool corresponding to a photographing screen may include: tapping a virtual key having a photographing function, tapping a virtual key having an image display function, sliding a focus frame having a focusing function, and the like. After determining the valid touch point with the largest touch pressure value from the at least one valid touch point, the terminal may compare a touch gesture indicated by the valid touch point with the largest touch pressure value with a gesture in a gesture resource pool corresponding to the currently displayed screen on the touchscreen. When the touch gesture indicated by the valid touch point with the largest touch pressure value matches the gesture in the gesture resource pool corresponding to the currently displayed screen on the touchscreen, the terminal performs a touch operation corresponding to the valid touch point with the largest touch pressure value. When the touch gesture indicated by the touch point with the largest touch pressure value does not match the gesture in the gesture resource pool corresponding to the currently displayed screen on the touchscreen, the terminal may determine a valid touch point with a second largest touch pressure value from the at least one valid touch point, a touch pressure value of the valid touch point with the second largest touch pressure value is less than a touch pressure value of the valid touch point with the largest touch pressure value and is greater than a touch pressure value of another valid touch point. When a two-touch gesture formed by the valid touch point with the largest touch pressure value and the valid touch point with the second largest touch pressure value matches a specified gesture in the preset gesture database, or when a touch gesture indicated by the valid touch point with the second largest touch pressure value matches a specified gesture in the preset gesture database, the terminal performs a touch operation corresponding to the matched specified gesture. Optionally, when the touch gesture indicated by the valid touch point with the largest touch pressure value does not match the gesture in the gesture resource pool corresponding to the currently displayed screen on the touchscreen, the terminal may determine the valid touch point with the second largest touch pressure value from the at least one valid touch point. When a multi-touch gesture formed by the valid touch point with the largest touch pressure value and the valid touch point with the second largest touch pressure value matches a specified gesture in the preset gesture database or the gesture in the gesture resource pool corresponding to the currently displayed screen, the terminal performs a touch operation corresponding to the multi-touch gesture formed by the valid touch point with the largest touch pressure value and the valid touch point with the second largest touch pressure value.

Optionally, the comparing, by the terminal, the touch pressure values of the at least two touch points to obtain at least one valid touch point may be specifically: comparing the touch pressure values of the at least two touch points with a preset pressure threshold, where a touch point whose touch pressure value is greater than the preset pressure threshold is the valid touch point. The preset pressure threshold may be a preset touch pressure value, such as 10N (newton), and no specific limitation is set thereto in this embodiment of the present invention. For example, after detecting the touch pressure value of each touch point by using the force sensor, the terminal may determine a touch point whose detected touch pressure value is greater than the preset pressure threshold as the valid touch point. For another example, after detecting the touch pressure value of each touch point by using the force sensor, the terminal may determine a touch point whose detected touch pressure value is greater than the preset pressure threshold as a candidate touch point, obtain a quantity of touch points supported by the currently displayed screen on the touchscreen, and determine the valid touch point from the candidate touch point. The quantity of valid touch points is less than or equal to a quantity of candidate touch points. It is found through research that a touch pressure value of a ghost point or a mis-operated touch point is relatively small. However, the user wants the terminal to perform a touch operation corresponding to a touch point that is corresponding to a touch pressure value greater than the preset pressure threshold.

Optionally, after comparing the detected touch pressure values of the touch points to obtain the at least one valid touch point, the terminal may obtain a touch track of each valid touch point, detect a touch operation corresponding to a valid touch point whose touch track is a sliding track, and perform the touch operation corresponding to the valid touch point whose touch track is a sliding track. The touch track may include a tap, a double-tap, a touch and hold, a slide, or the like.

For example, during a same period of time, the terminal detects a first touch point whose touch track is a touch and hold, a second touch point and a third touch point whose touch track is a sliding track, and a fourth touch point whose touch track is a tap. A touch pressure value of the first touch point is less than a touch pressure value of any other touch points. The terminal may determine the valid touch point to be the second touch point, the third touch point, and the fourth touch point. The touch track of the second touch point and the third touch point is a sliding track, and the terminal may perform a touch operation corresponding to the second touch point and the third touch point. This improves touch operation processing efficiency.

A second aspect of the present invention provides a computer storage medium, and the computer storage medium stores a program. When the program is executed, some or all steps of the touch response method for a touchscreen provided in the first aspect of the embodiments of the present invention are performed.

A third aspect of the present invention provides a terminal, including a touch pressure value detection module, a touch pressure value comparison module, and a touch operation execution module, where the touch pressure value detection module is configured to detect touch pressure values of at least two touch points applied on a touchscreen;

the touch pressure value comparison module is configured to compare the touch pressure values of the at least two touch points to obtain at least one valid touch point, where a touch pressure value of the valid touch point is greater than a touch pressure value of an invalid touch point of the at least two touch points; and the touch operation execution module is configured to: determine a touch operation corresponding to the valid touch point, and perform the touch operation.

Based on a same invention concept, for a principle and a beneficial effect of resolving a problem by the terminal, reference may be made to the first aspect and various possible implementations of the first aspect and beneficial effects thereof. Therefore, for implementation of the apparatus, reference may be made to the method implementation, and details are not repeated.

A fourth aspect of the present invention provides a terminal, including a processor, a memory, a touchscreen, and a force sensor, where the memory stores a set of program code, and the processor is configured to invoke the program code stored in the memory, to perform the following operations:

detecting touch pressure values of at least two touch points applied on the touchscreen; comparing the touch pressure values of the at least two touch points to obtain at least one valid touch point, where a touch pressure value of the valid touch point is greater than a touch pressure value of an invalid touch point of the at least two touch points; and determining a touch operation corresponding to the valid touch point, and performing the touch operation.

Optionally, the comparing, by the processor, the touch pressure values of the at least two touch points to obtain at least one valid touch point may be specifically:

obtaining a quantity of touch points supported by a currently displayed screen on the touchscreen; and comparing the touch pressure values of the at least two touch points to obtain the at least one valid touch point, where a quantity of valid touch points is less than or equal to the quantity of touch points supported by the currently displayed screen.

Optionally, the determining, by the processor, a touch operation corresponding to the valid touch point, and performing the touch operation may be specifically:

determining a valid touch point with a largest touch pressure value from the at least one valid touch point; and when a touch gesture indicated by the valid touch point with the largest touch pressure value matches a specified gesture in a preset gesture database, performing a touch operation corresponding to the valid touch point with the largest touch pressure value.

Optionally, the comparing, by the processor, the touch pressure values of the at least two touch points to obtain at least one valid touch point may be specifically: comparing the touch pressure values of the at least two touch points with a preset pressure threshold, where a touch point whose touch pressure value is greater than the preset pressure threshold is the valid touch point.

Optionally, after comparing the detected touch pressure values of the touch points to obtain the at least one valid touch point, the processor may further perform the following operation: obtaining a touch track of each valid touch point.

Further, the determining, by the processor, a touch operation corresponding to the valid touch point, and performing the touch operation may be specifically: detecting a touch operation corresponding to a valid touch point whose touch track is a sliding track, and performing the touch operation corresponding to the valid touch point whose touch track is a sliding track.

Based on a same invention concept, for a principle and a beneficial effect of resolving a problem by the terminal, reference may be made to the first aspect and various possible implementations of the first aspect and beneficial effects thereof. Therefore, for implementation of the apparatus, reference may be made to the method implementation, and details are not repeated.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
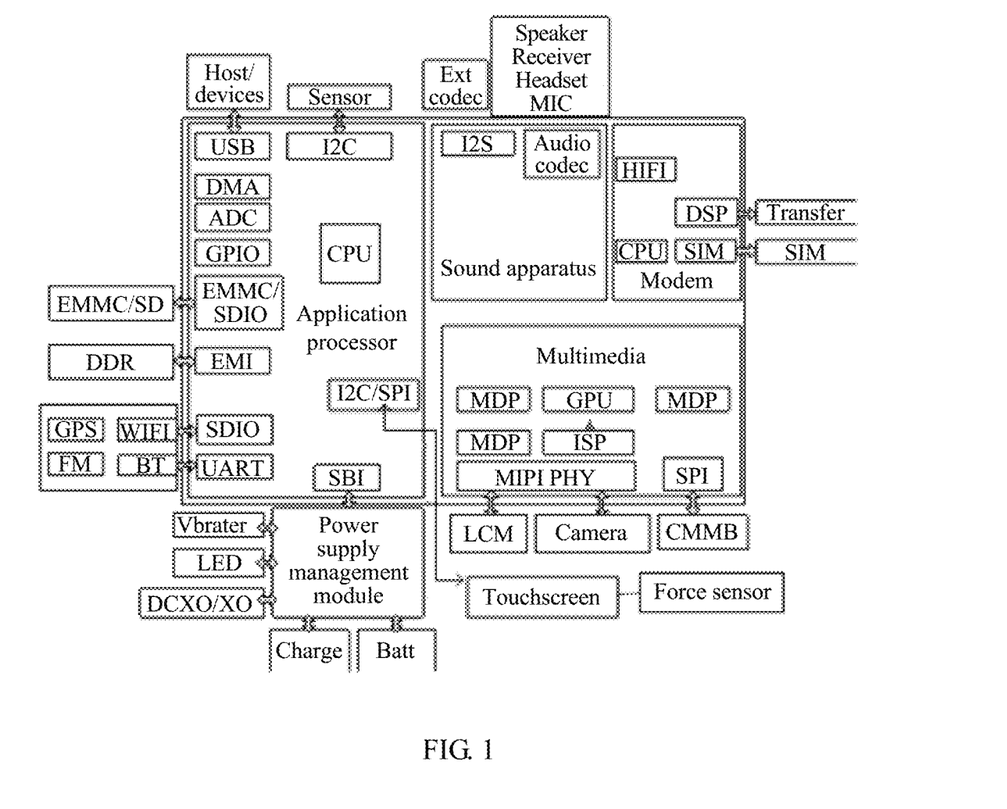
FIG. 1 is a schematic diagram of a circuit of a terminal according to an embodiment of the present invention.

Referring to FIG. 1, FIG. 1 is a schematic diagram of a circuit of a terminal according to an embodiment of the present invention. As shown in the figure, the terminal in this embodiment of the present invention may include a touchscreen (Touch Panel), a force sensor (Force Sensor), an application processor (Application Processor, AP), and the like. A communication connection is established between the touchscreen and the application processor by using a pin I2C/SPI of the application processor.

The touchscreen is configured to detect a touch point applied on the touchscreen.

The force sensor is configured to detect touch pressure values of at least two touch points applied on the touchscreen.

The application processor is configured to: compare the touch pressure values of the at least two touch points to obtain at least one valid touch point, where a touch pressure value of the valid touch point is greater than a touch pressure value of an invalid touch point of the at least two touch points; and determine a touch operation corresponding to the valid touch point, and perform the touch operation.

Figure 2:
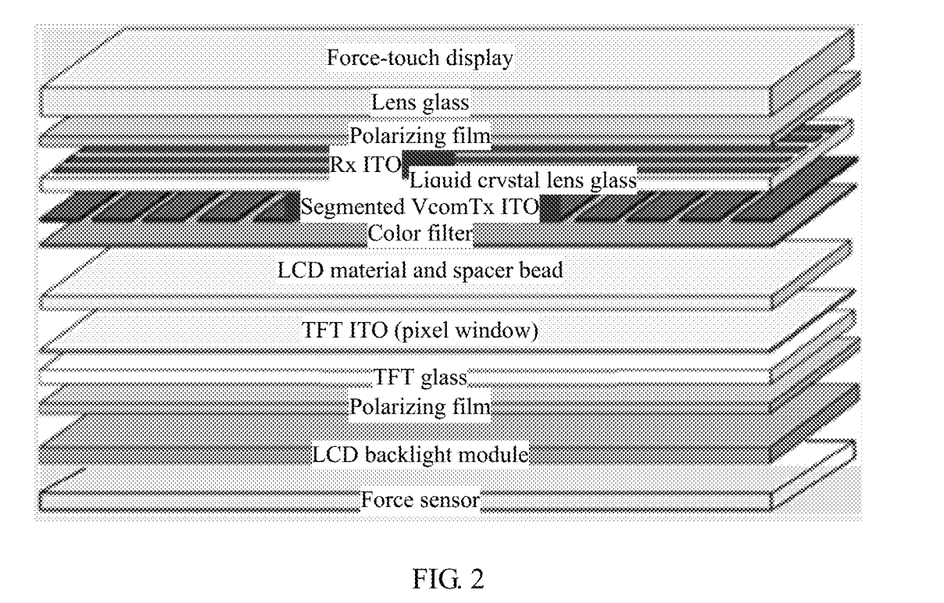
FIG. 2 is a schematic diagram of a structure between a touchscreen and a force sensor according to an embodiment of the present invention.

A schematic diagram of a structure between a touchscreen and a force sensor shown in FIG. 2 is used as an example. The touchscreen may be formed by stacking cover lens glass (cover lens glass), a polarizing film (polarizing film), Rx ITO (a ITO film connected to a receive electrode, where the ITO film is an n-type semiconductor material, and has high electric conductivity, high visible light transmittance, high mechanical hardness, and good chemical stability), CF glass (liquid crystal lens glass), segmented VcomTx ITO (an ITO film connected to a driving electrode of a segmented projected capacitive touchscreen), a color filter (color filter), an LCD material and spacer bead (LCD material and spacer bead), a TFT ITO (pixel window) (TFT ITO pixel window, TFT is short for thin film transistor), TFT glass (thin film transistor glass), a polarizing film, and an LCD backlight module (liquid crystal display backlight module). The force sensor is beneath the touchscreen, that is, the LCD backlight module of the touchscreen is disposed on a surface of the force sensor.

Figure 3:
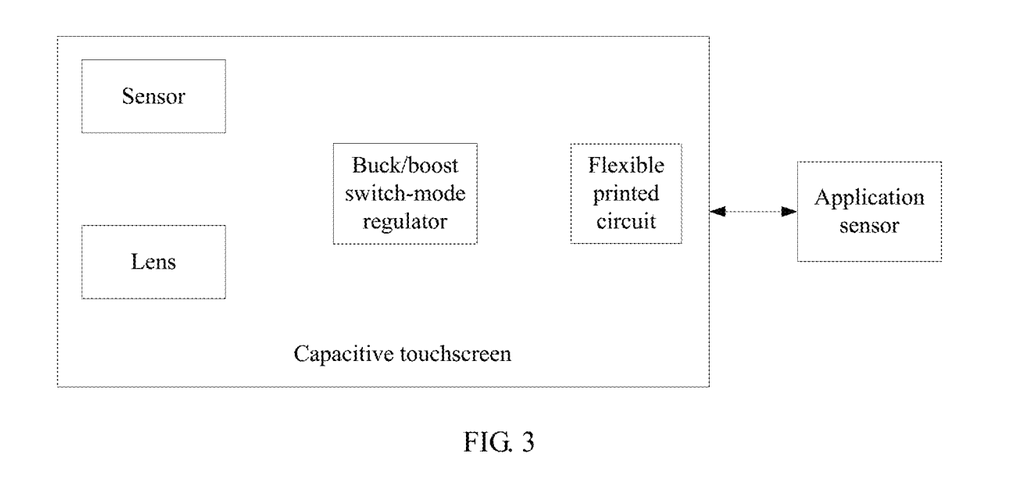
FIG. 3 is a schematic structural diagram of a capacitive touchscreen according to an embodiment of the present invention.

Further, the touchscreen may be a resistive touchscreen, a capacitive touchscreen, an infrared touchscreen, and a surface acoustic wave touchscreen. A capacitive touchscreen shown in FIG. 3 is used as an example. The capacitive touchscreen includes a TPIC (buck/boost switch-mode regulator), a flexible printed circuit (Flexible Printed Circuit, FPC), a lens (lens), and a sensor (sensor). The capacitive touchscreen is connected to the application processor by using an I2C pin of the application processor.

In specific implementation, the force sensor may convert a quantity value of a force applied by a user to a touch point on the touchscreen into an electrical signal, obtain, according to a pre-established correspondence between an electrical signal and a touch pressure value, a touch pressure value corresponding to the electrical signal, and use the touch pressure value as a touch pressure value of the touch point. For example, when the force sensor includes an elastic member and a strain gauge, the strain gauge may be firmly adhered to a surface of the elastic member. When a force is applied to the elastic member, the elastic member is deformed, and a resistance value of the strain gauge is changed (when strain occurs, a geometric shape and a resistivity of the strain gauge are changed, resulting in a change in the resistance value). The force sensor may obtain the touch pressure value of the touch point by using a resistance change amount. The strain gauge may be made of a metal foil or a semiconductor material. For another example, the force sensor may include a piezoelectric crystal. The force sensor may convert, based on a piezoelectric effect, a force into a potential difference between electrodes on two sides of the crystal by using the piezoelectric crystal, and obtain the touch pressure value of the touch point according to a potential change amount. For another example, a force can change an intrinsic frequency of a mechanical resonance system. The force sensor may obtain the touch pressure value of the touch point according to a frequency change amount. For another example, the force sensor may obtain, based on balance between an electromagnetic force and a to-be-measured force, force information from a relevant electromagnetic parameter during balance, and obtain the touch pressure value of the touch point.

The terminal in this embodiment of the present invention may be referred to as user equipment (User Equipment, "UE" for short), a mobile station (Mobile Station, "MS" for short), a mobile terminal (Mobile Terminal), a computer, a microcomputer, or the like. The terminal may communicate with one or more core networks by using a radio access network (Radio Access Network, "RAN" for short). For example, the terminal may be a mobile phone (which is also referred to as a "cellular" telephone), a computer having a mobile terminal, or the like. For example, the terminal may also be a portable, pocket, handheld, computer built-in or in-vehicle mobile apparatus. The foregoing devices exchange voice and/or data with a radio access network. The present invention sets no limitation thereto, and for example, the terminal also includes a terminal that has multiple bearer characteristics and that requires wired access.

Figure 4:
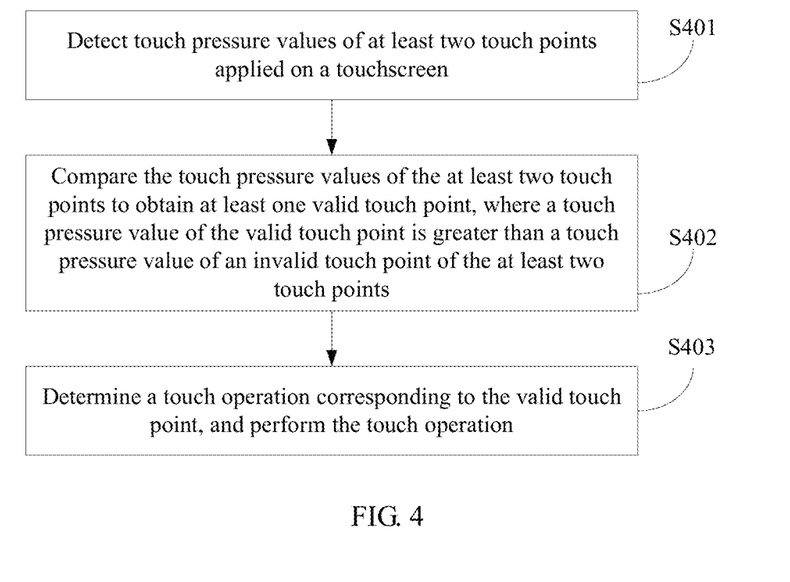
FIG. 4 is a schematic flowchart of a touch response method for a touchscreen according to an embodiment of the present invention.

Referring to FIG. 4, FIG. 4 is a schematic flowchart of a touch response method for a touchscreen according to an embodiment of the present invention. As shown in the figure, the touch response method for a touchscreen in this embodiment of the present invention may include the following steps.

S401. Detect touch pressure values of at least two touch points applied on a touchscreen.

Optionally, when at least two touch points simultaneously applied on the touchscreen are detected, touch pressure values of the at least two touch points simultaneously applied on the touchscreen are detected by using a force sensor.

When detecting the at least two touch points applied on the touchscreen, a terminal may detect a touch pressure value of each touch point by using the force sensor.

Figure 5A:
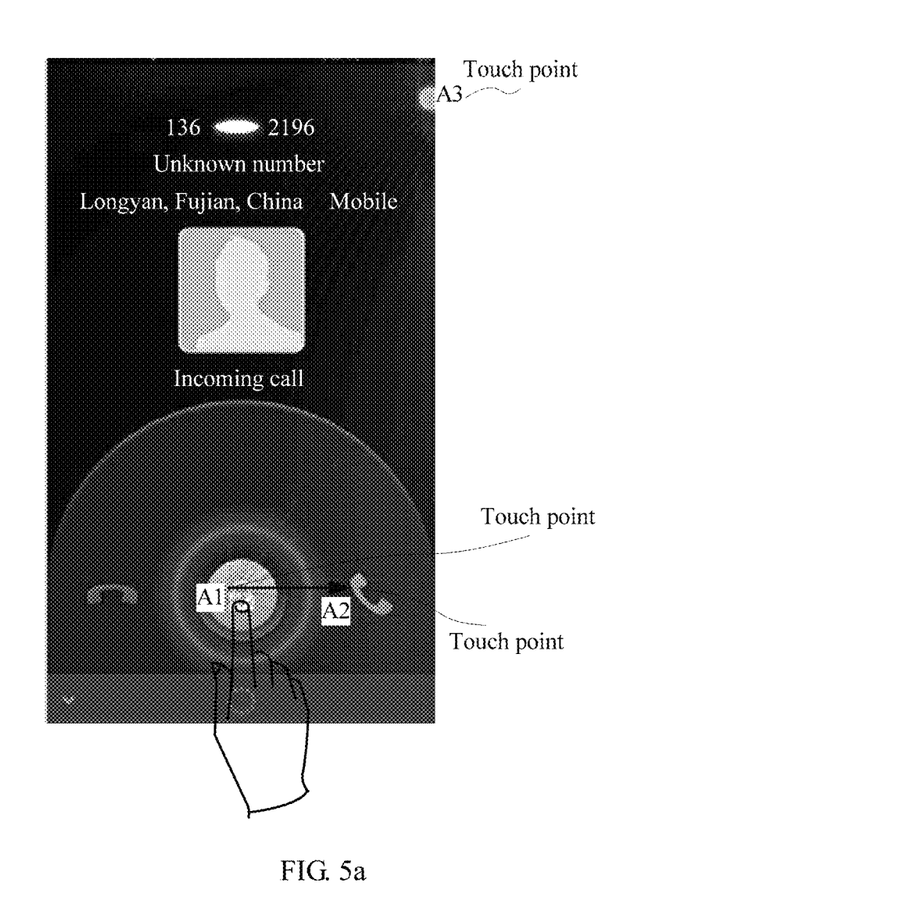
FIG. 5a is a schematic diagram of a screen of a touchscreen according to an embodiment of the present invention.

A schematic diagram of a screen of a touchscreen shown in FIG. 5a is used as an example. When an incoming call is detected, the touchscreen of the terminal is updated to a screen-on state. The terminal detects, by using the touchscreen, that a touch point applied on the touchscreen may include A1, A2, and A3. The terminal may detect a touch pressure value of each touch point by using the force sensor.

Figure 5B:
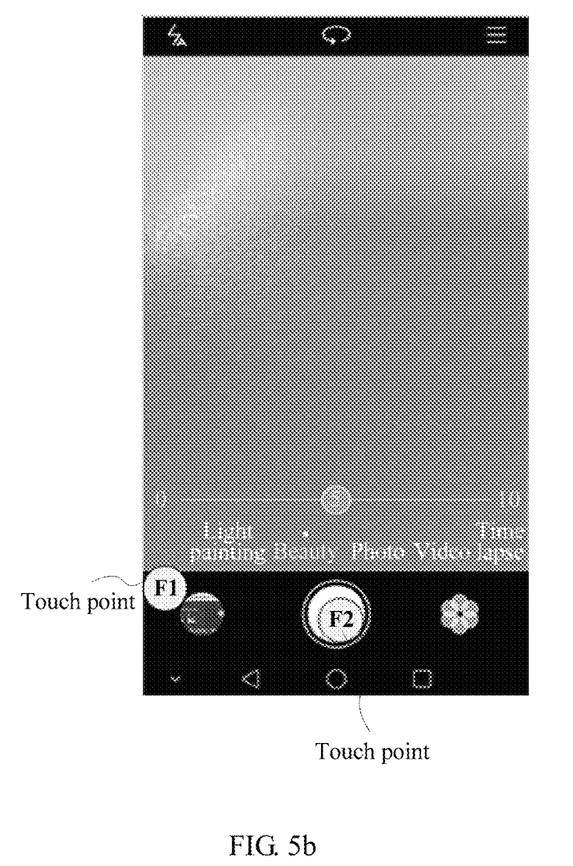
FIG. 5b is another schematic diagram of a screen of a touchscreen according to an embodiment of the present invention.

A schematic diagram of a screen of a touchscreen shown in FIG. 5b is used as an example. When a user single-handedly operates the terminal, a palm usually comes into contact with the touchscreen to cause an accidental touch. The terminal detects, by using the touchscreen, that a touch point applied on the touchscreen may include F1 and F2. The terminal may detect a touch pressure value of each touch point by using the force sensor.

For another example, when a terminal user touches the terminal, and a child aimlessly touches the terminal, the terminal detects, by using the touchscreen, that a touch point applied on the touchscreen may include at least one accidental touch point (that is, an invalid touch point) and another touch point (that is, a valid touch point) corresponding to a touch operation to which the user wants the terminal to respond. The terminal may detect a touch pressure value of each touch point by using the force sensor.

For another example, if the terminal user touches the terminal when taking a vehicle, or another user accidentally touches the terminal when the vehicle makes a turn or comes to a sudden stop, the terminal detects, by using the touchscreen, that a touch point applied on the touchscreen may include at least one accidental touch point and another touch point corresponding to a touch operation to which the user wants the terminal to respond. The terminal may detect a touch pressure value of each touch point by using the force sensor.

In an optional embodiment, the terminal may detect at least two touch points that are simultaneously applied on the touchscreen within a preset period of time, and detect, by using the force sensor, touch pressure values of the at least two touch points simultaneously applied on the touchscreen. The preset period of time may be preset duration, for example, 1 min or 5 min. For example, the preset period of time is 1 min. If the terminal detects that a touch point currently applied on the touchscreen includes a first touch point and a second touch point, and detects, within a period of 30 s after the first touch point and the second touch point are detected, that a touch point applied on the touchscreen is a third touch point, the terminal may separately detect touch pressure values of the first touch point, the second touch point, and the third touch point by using the force sensor. For another example, the preset period of time is 1 min. If the terminal detects that a touch point currently applied on the touchscreen includes a first touch point and a second touch point, and detects, within a period of 2 min after the first touch point and the second touch point are detected, that a touch point applied on the touchscreen is a third touch point, the terminal may separately detect touch pressure values of the first touch point and the second touch point by using the force sensor. In this embodiment of the present invention, the touch pressure values of the touch points applied on the touchscreen within the preset period of time are detected by using the force sensor, so as to avoid using a touch point detected within a relatively long period of time after a current system time as a valid touch point. This improves touch operation processing efficiency.

S402. Compare the touch pressure values of the at least two touch points to obtain at least one valid touch point, where a touch pressure value of the valid touch point is greater than a touch pressure value of an invalid touch point of the at least two touch points.

For example, the terminal may compare the detected touch pressure values of the touch points, and sort the touch points in descending order (or in ascending order), to obtain the at least one valid touch point. The touch pressure value of the valid touch point is greater than the touch pressure value of the invalid touch point of the sorted touch points. The terminal may identify the invalid touch point as a ghost point or an accidental touch point, and does not perform a touch operation corresponding to the invalid touch point.

In an optional embodiment, the terminal may obtain a quantity of touch points supported by a currently displayed screen on the touchscreen, and compare the touch pressure values of the at least two touch points to obtain the at least one valid touch point. A quantity of valid touch points is less than or equal to the quantity of touch points supported by the currently displayed screen.

In an optional embodiment, the touch pressure values of the at least two touch points are compared with a preset pressure threshold, and a touch point whose touch pressure value is greater than the preset pressure threshold is the valid touch point.

In an optional embodiment, after comparing the detected touch pressure values of the touch points to obtain the at least one valid touch point, the terminal may obtain a touch track of each valid touch point, detect a touch operation corresponding to a valide touch point whose touch track is a sliding track, and perform the touch operation corresponding to the touch point whose touch track is a sliding track.

S403. Determine a touch operation corresponding to the valid touch point, and perform the touch operation.

After obtaining the at least one valid touch point, the terminal may detect a touch operation corresponding to each valid touch point, and perform the touch operation.

The schematic diagram of the screen of the touchscreen shown in FIG. 5a is used as an example. The terminal detects that a touch point applied on the touchscreen includes A1, A2, and A3, and detects, by using the force sensor, that a touch pressure value of A1 is greater than a touch pressure value of A2 and the touch pressure value of A2 is greater than a touch pressure value of A3. When one touch point is supported by a currently displayed screen on the touchscreen, the terminal may determine a touch point (that is, A1) having a largest touch pressure value as a valid touch point, determine A2 and A3 as invalid touch points, determine a touch operation corresponding to A1, and further perform the touch operation. Optionally, when two touch points are supported by the currently displayed screen on the touchscreen, the terminal may match a touch gesture indicated by the touch point (that is, A1) having the largest touch pressure value with a specified gesture in a preset gesture database. When the touch gesture indicated by A1 matches the specified gesture in the preset gesture database, the terminal may determine A1 as a valid touch point, determine A2 and A3 as invalid touch points, determine a touch operation corresponding to A1, and further perform the touch operation. Optionally, when two touch points are supported by the currently displayed screen on the touchscreen, the terminal may match a touch gesture indicated by two touch points (for example, A1 and A2) having larger touch pressure values with a specified gesture in the preset gesture database. When the touch gesture of a multi-touch formed by A1 and A2 matches the specified gesture in the preset gesture database, the terminal may determine A1 and A2 as valid touch points, determine A3 as an invalid touch point, determine a touch operation corresponding to the multi-touch formed by A1 and A2, and further perform the touch operation. Optionally, when three touch points are supported by the currently displayed screen on the touchscreen, and the terminal detects that a touch track of a multi-touch formed by A1 and A2 is a right horizontal slide and a touch track of A3 is a tap on the touchscreen, the terminal may determine that the touch track of the multi-touch formed by A1 and A2 is a sliding track, determine A1 and A2 as valid touch points, determine A3 as an invalid touch point, and determine that a touch operation corresponding to A1 and A2 is a right slide on a calling screen, so that the terminal can answer the call.

The schematic diagram of the screen of the touchscreen shown in FIG. 5b is used as an example. The terminal detects that at least two touch points applied on the touchscreen include F1 and F2, and detects that a touch pressure value of F2 is greater than a touch pressure value of F1 by using the force sensor. When one touch point is supported by a currently displayed screen on the touchscreen, the terminal may determine a touch point (that is, F2) having a largest touch pressure value as a valid touch point, determine F1 as an invalid touch point, determine a touch operation corresponding to F2, and further perform the touch operation. Optionally, when two touch points are supported by the currently displayed screen on the touchscreen, the terminal may match a touch gesture indicated by the touch point (that is, F2) having the largest touch pressure value with a specified gesture in a preset gesture database. When the touch gesture indicated by F2 matches the specified gesture in the preset gesture database, the terminal may determine F2 as a valid touch point, determine F1 as an invalid touch point, and determine a touch operation corresponding to F2 as tapping a virtual key having a photographing function, so that the terminal can execute a photographing instruction. Optionally, when two touch points are supported by the currently displayed screen on the touchscreen, the terminal may match a touch gesture indicated by F1 and F2 with a specified gesture in the preset gesture database. When the touch gesture of a multi-touch formed by F1 and F2 matches the specified gesture in the preset gesture database, the terminal may determine F1 and F2 as valid touch points, determine a touch operation corresponding to the multi-touch formed by F1 and F2, and further perform the touch operation.

In an optional embodiment, the terminal may determine a valid touch point with a largest touch pressure value from the at least one valid touch point, when a touch gesture indicated by the valid touch point with the largest touch pressure value matches a specified gesture in the preset gesture database, perform a touch operation corresponding to the valid touch point with the largest touch pressure value.

According to the touch response method for a touchscreen in FIG. 4, when the at least two touch points simultaneously applied on the touchscreen are detected, the touch pressure value of each touch point is detected by using the force sensor, and the touch pressure values of the at least two touch points are compared to obtain the at least one valid touch point. The touch pressure value of each valid touch point is greater than the touch pressure value of the invalid touch point of the at least two detected touch points, the touch operation corresponding to the valid touch point is determined, and the touch operation is performed. This can avoid a failure in responding to a touch operation corresponding to a touch point on a touchscreen can be avoided, and can improve touch operation processing efficiency.

An embodiment of the present invention further provides a computer storage medium, and the computer storage medium may store a program. When the program is executed, some or all steps of an application protection method recorded in the method embodiment shown in FIG. 4 are performed.

Figure 6:
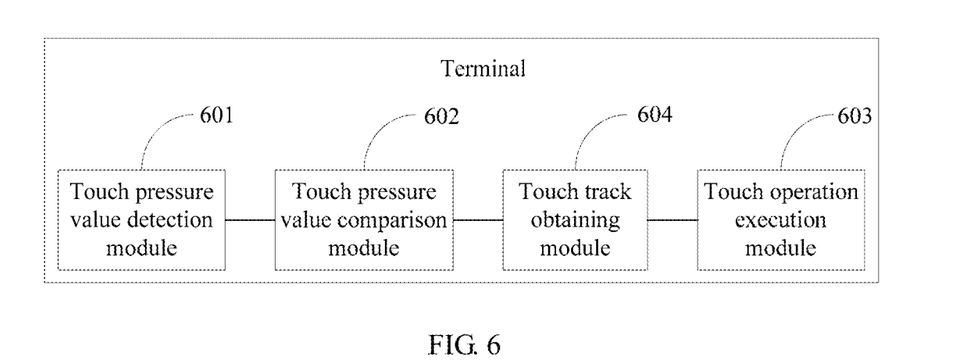
FIG. 6 is a schematic structural diagram of a terminal according to an embodiment of the present invention.

Referring to FIG. 6, FIG. 6 is a schematic structural diagram of a terminal according to an embodiment of the present invention. The terminal may be configured to implement some or all steps of the touch response method for a touchscreen in the method embodiment described with reference to FIG. 4. The terminal may include a touch pressure value detection module 601, a touch pressure value comparison module 602, and a touch operation execution module 603.

The touch pressure value detection module 601 is configured to detect touch pressure values of at least two touch points applied on a touchscreen. Optionally, when detecting at least two touch points simultaneously applied on a touchscreen, the touch pressure value detection module 601 detects a touch pressure value of each touch point by using a force sensor.

The touch pressure value comparison module 602 is configured to compare the touch pressure values of the at least two touch points to obtain at least one valid touch point, where a touch pressure value of the valid touch point is greater than a touch pressure value of an invalid touch point of the at least two touch points.

The touch operation execution module 603 is configured to: determine a touch operation corresponding to the valid touch point, and perform the touch operation.

In an optional embodiment, the touch pressure value comparison module 602 is specifically configured to:

obtain a quantity of touch points supported by a currently displayed screen, that is, obtain the quantity of touch points supported by the currently displayed screen on the touchscreen; and compare the touch pressure values of the at least two touch points to obtain the at least one valid touch point, where a quantity of valid touch points is less than or equal to the quantity of touch points supported by the currently displayed screen.

In an optional embodiment, the touch operation execution module 603 is specifically configured to:

determine a valid touch point with a largest touch pressure value from the at least one valid touch point; and when a touch gesture indicated by the valid touch point with the largest touch pressure value matches a specified gesture in a preset gesture database, perform a touch operation corresponding to the valid touch point with the largest touch pressure value.

In an optional embodiment, a touch point whose touch pressure value is greater than a preset pressure threshold is the valid touch point.

In an optional embodiment, the terminal in this embodiment of the present invention may further include:

a touch track obtaining module 604, configured to: after the touch pressure value comparison module 602 compares the touch pressure values of the at least two touch points to obtain the at least one valid touch point, obtain a touch track of each valid touch point.

The touch operation execution module 603 is specifically configured to: detect a touch operation corresponding to a valid touch point whose touch track is a sliding track, and perform the touch operation corresponding to the valid touch point whose touch track is a sliding track.

In the terminal shown in FIG. 6, when detecting the at least two touch points simultaneously applied on the touchscreen, the touch pressure value detection module 601 detects the touch pressure value of each touch point by using the force sensor. The touch pressure value comparison module 602 compares the detected touch pressure values of the touch points to obtain the at least one valid touch point. The touch pressure value of the valid touch point is greater than the touch pressure value of the invalid touch point of the at least two detected touch points. The touch operation execution module 603 determines the touch operation corresponding to the valid touch point, and performs the touch operation. This can avoid a failure in responding to a touch operation corresponding to a touch point on a touchscreen can be avoided, and can improve touch operation processing efficiency.

It should be noted that, based on a same invention concept, a principle of resolving a problem by the terminal provided in this embodiment of the present invention is similar to that of the touch response method for a touchscreen in the method embodiment of the present invention. Therefore, for implementation of the terminal, reference may be made to the description corresponding to the devices in the method implementation and the corresponding description in FIG. 4, and details are not repeated herein.

Figure 7:
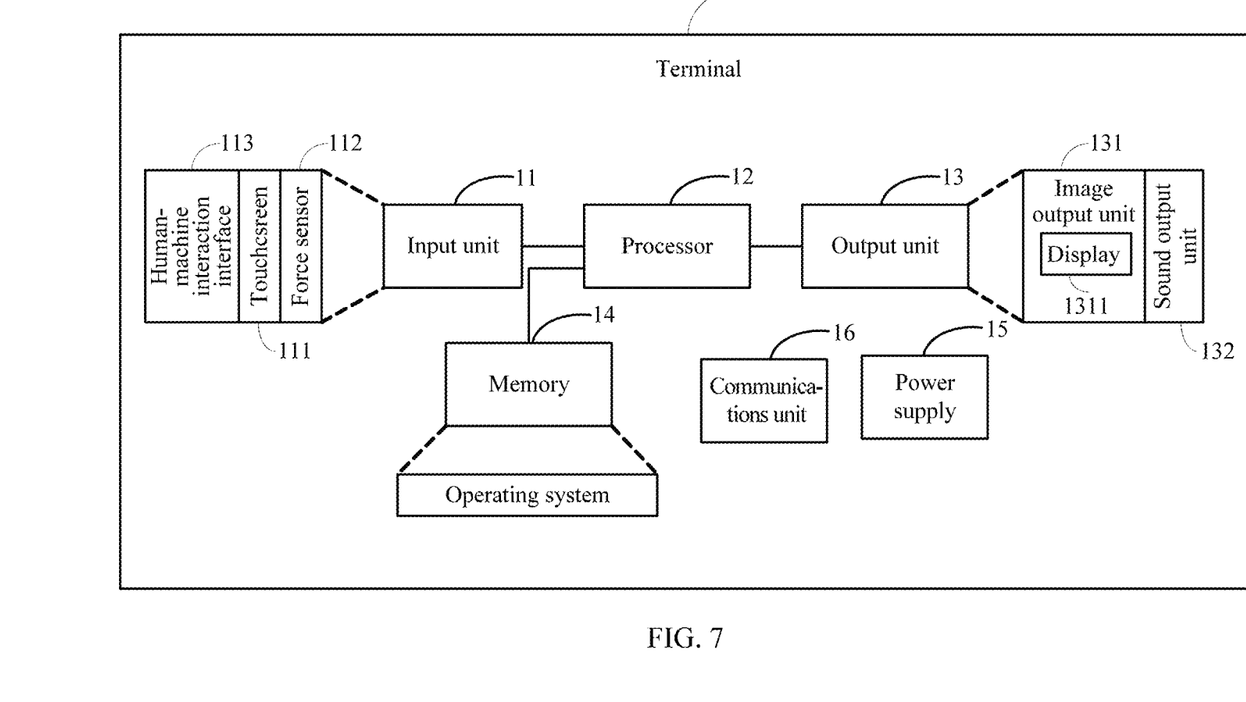
FIG. 7 is a schematic structural diagram of another terminal according to an embodiment of the present invention.

Referring to FIG. 7, FIG. 7 is a schematic structural diagram of another terminal according to an embodiment of the present invention. The terminal provided in this embodiment of the present invention may be configured to implement the method implemented in the embodiment of the present invention shown in FIG. 4. For ease of description, only content related to this embodiment of the present invention is described, and for specific technical detail that is not described, refer to the embodiments of the present invention shown in FIG. 4.

As shown in FIG. 7, the terminal 7 includes components such as an input unit 11, at least one processor 12, an output unit 13, a memory 14, a power supply 15, and a communications unit 16. These components perform communication by using one or more buses.

It can be understood by a person skilled in the art that a structure of the terminal shown in the figure does not constitute a limitation on the present invention. The structure may be either a bus-type structure or a star structure, and may include more or fewer components than those shown in the figure, or a combination of some components, or differently disposed components. In this implementation of the present invention, the terminal 1 may be any electronic device having a touchscreen and a force sensor, including, but not limited to, a mobile phone, a mobile computer, a tablet computer, a personal digital assistant (Personal Digital Assistant, PDA for short), a media player, a smart television set, a combination of the foregoing two or more items, and the like.

The input unit 11 is configured to: implement interaction between a user and the terminal 1, and/or input information into the terminal 1. For example, the input unit 11 may receive digital or character information input by the user, to generate signal input related to a user setting or function control. In a specific implementation of the present invention, the input unit 11 includes at least a touchscreen 111 and a force sensor 112. The input unit 11 may further include another human-machine interaction interface 113, such as a camera, an acceleration sensor, a geomagnetism sensor, an angular velocity sensor, or an infrared sensor.

The touchscreen 111 may collect an operation action performed on or near the touchscreen 111 by the user, such as an operation performed at a location on or near the touchscreen 111 by the user by using any suitable object or accessory such as a finger or a stylus, and drive a corresponding connection apparatus according to a preset program. Optionally, the touchscreen 111 may include two parts: a touch detection apparatus and a touch controller. The touch detection apparatus detects a touch operation performed by the user, converts the detected touch operation into an electrical signal, and transmits the electrical signal to the touch controller. The touch controller receives the electrical signal from the touch detection apparatus, converts the electrical signal into contact coordinates, and then sends the contact coordinates to the processor 12. The touch controller may also receive and execute a command sent from the processor 12. In addition, the touchscreen 111 may be implemented in various types, such as a resistive type, a capacitive type, an infrared (infrared) type, and a surface acoustic wave type. In another implementation of the present invention, a physical input key used by the input unit 11 may include, but is not limited to, one or more of a physical keyboard, a function key (such as a volume control key and a switch key), a trackball, a mouse, or a joystick. The input unit 11 in a form of a microphone may collect a voice that is input by the user or an environment, and convert the voice into a command that the processor 12 can execute and that is in a form of an electrical signal.

The force sensor 112 may detect a touch pressure value of each touch point. For example, the force sensor 112 may include a resistance strain gauge pressure sensor, a semiconductor strain gauge pressure sensor, a piezoresistive pressure sensor, an inductive pressure sensor, a capacitive pressure sensor, a resonant pressure sensor, a capacitive acceleration sensor, and the like.

The processor 12 is a control center of the terminal 1, connects various parts of the entire terminal 1 by using various interfaces and lines, and runs or executes a software program and/or a module stored in the memory 14 and invokes data stored in the memory 14, so as to perform various functions of the terminal 1 and/or process data. The processor 12 may include an integrated circuit (Integrated Circuit, IC for short). For example, the processor 12 may include a single packaged IC, or may include multiple packaged ICs that have a same function or different functions. For example, the processor 12 may merely include a central processing unit (Central Processing Unit, CPU for short), or may be a combination of a GPU, a digital signal processor (Digital Signal Processor, DSP for short), and a control chip (such as a baseband chip) of the communications unit 16. In this implementation of the present invention, the CPU may be a single operation core or a multi-operation core.

The output unit 13 includes, but is not limited to, an image output unit 131 and a sound output unit 132. The image output unit 131 is configured to output prompt information, and the prompt information may be a character, a picture, a video, and/or the like. The sound output unit 132 may be a vibration sensor, a microphone, or the like, and is configured to output prompt information, and the prompt information may be vibration, a ringtone, or the like. The image output unit 131 in this embodiment of the present invention includes at least a display 1311, for example, a display configured in a form of a liquid crystal display (Liquid Crystal Display, LCD for short), an organic light-emitting diode (Organic Light-Emitting Diode, OLED for short), a field emission display (Field Emission Display, FED for short), or the like. Alternatively, the image output unit 131 may include a reflective display, for example, an electrophoretic (electrophoretic) display, or a display using an interferometric modulation of light technology (Interferometric Modulation of Light). The image output unit 131 may include a single display or multiple displays of different sizes. In a specific implementation of the present invention, the touchscreen 111 used by the input unit 11 and the display 1311 used by the output unit 13 may be collectively referred to as a display. When detecting a gesture operation performed on or near the touchscreen 111, the touchscreen 111 sends the gesture operation to the processor 12 to determine a touch event type, and then the processor 12 provides a corresponding visual output on the display 1311 according to the touch event type. Although in FIG. 1, the input unit 11 and the output unit 13 act as two separate components to implement input and output functions of the terminal 1 as two separate components, in some embodiments, the touchscreen 111 and the display 1311 may be integrated to implement the input and output functions of the terminal 1. For example, the image output unit 131 may display various graphical user interfaces (Graphical User Interface, GUI for short) that are used as virtual control components, including, but not limited to, a window, a scroll bar, an icon, and a scrapbook, so that the user performs an operation in a touch manner.

In a specific implementation of the present invention, the image output unit 131 includes a filter and an amplifier, configured to filter and amplify a video output by the processor 12. The sound output unit 132 includes a digital-to-analog converter, configured to convert an audio signal output by the processor 12 from a digital format into an analog format.

The memory 14 may be configured to store a software program and a module, the processor 12 runs the software program and the module that are stored in the memory 14, to perform various functional applications of the terminal 1 and implement data processing. The memory 14 mainly includes a program memory area and a data storage area. The program storage area may store an operating system and an application program, such as a sound player program and an image playback program, required by at least one function. The data storage area may store data (such as audio data and a phone book) and the like that are created according to usage of the terminal 1. In a specific implementation of the present invention, the memory 14 may include a volatile memory, such as a nonvolatile random access memory (Nonvolatile RandomAccess Memory, NVRAM for short), a phase change random access memory (Phase Change RAM, PRAM for short), or a magnetoresistive random access memory (Magnetoresistive RAM, MRAM for short), or may include a nonvolatile memory, such as at least one disk storage device, an electrically erasable programmable read-only memory (Electrically Erasable ProgrammableRead-OnlyMemory, EEPROM for short), or a flash memory device such as a NOR flash memory (NOR flash memory) or a NAND flash memory (NAND flash memory). The nonvolatile memory stores the operating system and the application program that are executed by the processor. The memory 14 loads a running program and data from the nonvolatile memory into the memory and stores digital content in a large-capacity storage apparatus. The operating system includes various components and/or drivers configured to: control and manage such conventional system tasks as memory management, storage device control, and power supply management, and facilitate communication between various hardware and software. In the implementation of the present invention, the operating system may be the Android system of Google, the iOS system developed by Apple, the Windows operating system developed by Microsoft, or the like, or may be an embedded operating system such as Vxworks.

The application program includes any application installed on an electronic device, including, but not limited to, a browser, an email, an instant messaging service, word processing, a virtual keyboard, a window widget (Widget), encryption, digital rights management, speech recognition, voice replication, positioning (such as a function provided by a global positioning system), or music play, and the like.

The power supply 15 is used to supply power to different components of the terminal 1, to maintain operation of the components. As a general understanding, the power supply may be a built-in battery, such as a common lithium-ion battery or a nickel-metal hydride battery, and also includes an external power supply, such as an AC adapter, that directly supplies power to an electronic device. In some implementations of the present invention, the power supply may also be more broadly defined, for example, may include a power supply management system, a charging system, a power failure detection circuit, a power converter or an inverter, a power status indicator (such as a diode), and any other component associated with electricity generation, management, and distribution of the electronic device.

The communications unit 16 is configured to establish a communication channel, so that the terminal 1 is connected to a remote server by using the communication channel and downloads media data from the remote server. The communications unit 16 may include such communications modules as a wireless local area network (Wireless Local Area Network, WLAN for short) module, a Bluetooth module, and a baseband (Base Band) module, a radio frequency (Radio Frequency, RF for short) circuit corresponding to the communications module. The radio frequency circuit is configured to perform wireless local area network communication, Bluetooth communication, infrared communication, and/or cellular communication system communication, for example, wideband code division multiple access (Wideband Code DivisionMultiple Access, WCDMA for short) and/or High Speed Downlink Packet Access (High Speed Downlink PacketAccess, HSDPA for short). The communications module is configured to control communication of the components of the electronic device, and can support direct memory access (Direct MemoryAccess).

In different implementations of the present invention, various communications modules of the communications unit 16 are generally in a form of an integrated circuit chip, and may be selectively combined with no need to include all communications modules and corresponding antenna groups. For example, the communications unit 16 may include only a baseband chip, a radio frequency chip, and a corresponding antenna, so as to provide a communication function in a cellular communication system. By using the wireless communication connection such as wireless LAN access or WCDMA access established by the communications unit 16, the terminal 1 may be connected to a cellular network (Cellular Network) or the Internet (Internet). In some optional implementations of the present invention, the communications modules, such as a baseband module, of the communications unit 16 may be integrated into the processor 12. A typical example is a series of APQ+MDM platforms provided by Qualcomm (Qualcomm).

The radio frequency circuit is configured to receive and send a signal during message reception or calling. For example, after receiving downlink information of a base station, the radio frequency circuit sends the downlink information to the processor 12 for processing, and sends uplink-related data to the base station. Generally, the radio frequency circuit includes a known circuit configured to perform these functions, including, but not limited to, an antenna system, a radio frequency transceiver, one or more amplifiers, a tuner, one or more oscillators, a digital signal processor, a codec (Codec) chipset, a subscriber identity module (SIM) card, a memory, and the like. In addition, the radio frequency circuit may also communicate with another device by means of wireless communication and by using a network. Wireless communication may use any communication standard or protocol, including, but not limited to, the Global System for Mobile Communications (Global System of Mobile communication, GSM for short), the General Packet Radio Service (General Packet Radio Service, GPRS for short), the Code Division Multiple Access (Code Division Multiple Access, CDMA for short), the Wideband Code Division Multiple Access (Wideband Code Division Multiple Access, WCDMA for short), a High Speed Uplink Packet Access (HighSpeedUplinkPacketAccess, HSUPA for short) technology, Long Term Evolution (Long Term Evolution, LTE for short), an email, a short message service (Short Messaging Service, SMS for short).

In a possible implementation, when detecting at least two touch points simultaneously applied on the touchscreen, the touchscreen 111 of the input unit 11 detects, by using the force sensor 112, touch pressure values of the at least two touch points applied on the touchscreen.

The processor 12 compares the touch pressure values of the at least two touch points to obtain at least one valid touch point. A touch pressure value of the valid touch point is greater than a touch pressure value of an invalid touch point of the at least two detected touch points.

The processor 12 determines a touch operation corresponding to the valid touch point, and performs the touch operation.

Optionally, that the processor 12 compares the touch pressure values of the at least two touch points to obtain at least one valid touch point may be specifically:

obtaining, by the processor 12, a quantity of touch points supported by a currently displayed screen on the touchscreen; and comparing, by the processor 12, the touch pressure values of the at least two touch points to obtain the at least one valid touch point, where a quantity of valid touch points is less than or equal to the quantity of touch points supported by the currently displayed screen.

Optionally, that the processor 12 determines a touch operation corresponding to the valid touch point, and performs the touch operation may be specifically:

determining a valid touch point with a largest touch pressure value from the at least one valid touch point; and when a touch gesture indicated by the valid touch point with the largest touch pressure value matches a specified gesture in a preset gesture database, performing a touch operation corresponding to the valid touch point with the largest touch pressure value.

Optionally, the touch pressure value of each valid touch point is greater than a preset pressure threshold.

Optionally, after comparing the detected touch pressure values of the touch points to obtain the at least one valid touch point, the processor 12 may further perform the following operation:

obtaining a touch track of each valid touch point.

Further, that the processor 12 determines a touch operation corresponding to the valid touch point, and performs the touch operation may be specifically:

detecting a touch operation corresponding to a valid touch point whose touch track is a sliding track, and performing the touch operation corresponding to the valid touch point whose touch track is a sliding track.

It should be noted that, based on a same invention concept, a principle of resolving a problem by the terminal provided in this embodiment of the present invention is similar to that of the touch response method for a touchscreen in the method embodiment of the present invention. Therefore, for implementation of the terminal, reference may be made to the description corresponding to the devices in the method implementation and the corresponding description in FIG. 4, and details are not repeated herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

It should be noted that, in the foregoing embodiments, the description of each embodiment has respective focuses. For a part that is not described in detail in an embodiment, reference may be made to related descriptions in other embodiments. In addition, a person skilled in the art should also understand that all the embodiments described in this specification are example embodiments, and the involved actions and units are not necessarily mandatory to the present invention.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A touch response method for a touchscreen, wherein the method comprises:
    detecting touch pressure values of at least two touch points applied on a touchscreen;
    comparing the touch pressure values of the at least two touch points, and sorting the touch pressure values, to obtain at least one valid touch point, wherein a touch pressure value of the valid touch point is greater than a touch pressure value of an invalid touch point of the at least two touch points;
    determining a gesture resource pool corresponding to a currently displayed screen on the touch screen;
    determining a touch gesture indicated by the at least one valid touch point matches a gesture in a preset gesture database, wherein:
        the preset gesture database comprise multiple gesture resource pools; and
        the gesture in the preset gesture database corresponds to the gesture resource pool of the currently displayed screen; and
    in response to the determination that the touch gesture indicated by the at least one valid touch point matches the gesture in the gesture resource pool of the preset gesture database, determining a touch operation corresponding to the at least one valid touch point, and performing the touch operation.

2. The method according to claim 1, wherein comparing the touch pressure values of the at least two touch points to obtain the at least one valid touch point comprises:
    obtaining a quantity of touch points supported by the currently displayed screen on the touchscreen; and
    comparing the touch pressure values of the at least two touch points to obtain the at least one valid touch point, wherein a quantity of valid touch points is less than or equal to the quantity of touch points supported by the currently displayed screen.

3. The method of claim 1, wherein comparing the touch pressure values of the at least two touch points to obtain at least one valid touch point comprises:
    comparing the touch pressure values of the at least two touch points with a preset pressure threshold, wherein a touch point whose touch pressure value is greater than the preset pressure threshold is the valid touch point.

4. The method according to claim 1, wherein after comparing the detected touch pressure values of the touch points to obtain the at least one valid touch point, the method further comprises:
    obtaining a touch track of each of the at least one valid touch point, wherein the at least one valid touch point corresponds to a touch operation having a sliding track.

5. A terminal, wherein the terminal comprises:
    a touch pressure value detection module, configured to detect touch pressure values of at least two touch points applied on a touchscreen;
    a touch pressure value comparison module, configured to compare the touch pressure values of the at least two touch points, and sort the touch pressure values, to obtain at least one valid touch point, wherein a touch pressure value of the valid touch point is greater than a touch pressure value of an invalid touch point of the at least two touch points; and
    a touch operation execution module, configured to:
        determine a gesture resource pool corresponding to a currently displayed screen on the touch screen;
        determine a touch gesture indicated by the at least one valid touch point matches a gesture in a preset gesture database, wherein:
            the preset gesture database comprise multiple gesture resource pools; and
            the gesture in the preset gesture database corresponds to the gesture resource pool of the currently displayed screen; and
        in response to the determination that the touch gesture indicated by the at least one valid touch point matches the gesture in the gesture resource pool of the preset gesture database,
        determine a touch operation corresponding to the at least one valid touch point, and perform the touch operation.

6. The terminal according to claim 5, wherein the touch pressure value comparison module is configured to:
    obtain a quantity of touch points supported by the currently displayed screen on the touchscreen; and
    compare the touch pressure values of the at least two touch points to obtain the at least one valid touch point, wherein a quantity of valid touch points is less than or equal to the quantity of touch points supported by the currently displayed screen.

7. The terminal of claim 5, wherein
    comparing the touch pressure values of the at least two touch points to obtain the at least one valid touch point comprises:
    comparing the touch pressure values of the at least two touch points with a preset pressure threshold, wherein a touch point whose touch pressure value is greater than the preset pressure threshold is the valid touch point.

8. The terminal according to claim 5, wherein the terminal further comprises:
    a touch track obtaining module, configured to: after the touch pressure value comparison module compares the touch pressure values of the at least two touch points to obtain the at least one valid touch point, obtain a touch track of each of the at least one valid touch point, wherein the at least one valid touch point corresponds to a touch operation having a sliding track.

9. A terminal, comprising a processor, a memory, and a touchscreen, wherein the memory stores a set of program code, and the processor is configured to invoke the program code stored in the memory, to perform the following operations:
    detecting touch pressure values of at least two touch points applied on a touchscreen;
    comparing the touch pressure values of the at least two touch points, and sorting the touch pressure values, to obtain at least one valid touch point, wherein a touch pressure value of the valid touch point is greater than a touch pressure value of an invalid touch point of the at least two touch points;
    determining a gesture resource pool corresponding to a currently displayed screen on the touch screen;
    determining a touch gesture indicated by the at least one valid touch point matches a gesture in a preset gesture database, wherein:
        the preset gesture database comprise multiple gesture resource pools; and
        the gesture in the preset gesture database corresponds to the gesture resource pool of the currently displayed screen; and in response to the determination that the touch gesture indicated by the at least one valid touch point matches the gesture in the gesture resource pool of the preset gesture database, determining a touch operation corresponding to the valid touch point, and performing the touch operation.

10. The terminal according to claim 9, wherein comparing the touch pressure values of the at least two touch points to obtain the at least one valid touch point comprises:

obtaining a quantity of touch points supported by the currently displayed screen on the touchscreen; and comparing the touch pressure values of the at least two touch points to obtain the at least one valid touch point, wherein a quantity of valid touch points is less than or equal to the quantity of touch points supported by the currently displayed screen.

11. The terminal of claim 9, wherein the comparing the touch pressure values of the at least two touch points to obtain at least one valid touch point comprises:

comparing the touch pressure values of the at least two touch points with a preset pressure threshold, wherein a touch point whose touch pressure value is greater than the preset pressure threshold is the valid touch point.

12. The terminal according to claim 9, wherein after comparing the detected touch pressure values of the touch points to obtain the at least one valid touch point, the terminal further comprises:

obtaining a touch track of each of the at least one valid touch point, wherein the at least one valid touch point corresponds to a touch operation having a sliding track.

\* \* \* \* \*